106. COMPOSITIONS, COATING OR PLASTIC.
91

Patented Oct. 23, 1934

1,978,141

UNITED STATES PATENT OFFICE 1,978,141

DRY POWDER CEMENT PAINT PREPARATION

William P. D. Moross, Chattanooga, Tenn., assignor to American Cement Paint Co., Rossville, Ga., a corporation of Georgia No Drawing. Application June 19, 1930, Serial No. 462,430

2 Claims. (Cl. 134—46)

This invention relates to a dry powder cement paint preparation.

An object of the invention is the provision of a dry powder paint which consists of three essential elements. First, a body or base composed of Portland cement, a combination of inert filler materials and a sufficient quantity of caseins, or a mixture of caseins to effectively neutralize the free alkali present in the cement; second, a re-action-mixture designed to retard the initial setting and accelerate the ultimate hardening of the cement employed in the body or base; third, a vehicle forming mixture consisting of caseins or mixture of caseins together with the necessary auxiliary materials for producing an adhesive colloidal gel which serves as a binder and vehicle for the paint.

Another object of the invention is the provision of a dry powder cement paint preparation in which a body or base, a re-action-mixture, and a vehicle forming mixture are blended into each other in the proper proportions and ground to a suitable degree of fineness, the material being marketed as a dry powder but which must be mixed with water before application to a surface.

A further object of the invention is the provision of a cement paint which will readily mix with water and have the characteristics of a slightly heavy oil paint in that the cement paint will flow and spread and have high flattening properties almost identical with those of oil paints, the paint being readily applied by means of a brush or spray to give a uniform coating.

Another object of the invention is the provision of a cement paint having the characteristics of a slightly heavy oil paint but which will form an integral bond in the outer surface of the wall so that it is possible to apply the paint to any surface to which a non-elastic coating is desired, such surfaces being preferably cementitious, the paint being effectively neutral and having the property of locking in lime other alkalies present in the surface, thereby permitting further application of lacquers, enamels, oil paints, without danger of saponification of the oil vehicle of the finished coat and its consequent raking down.

This invention will be best understood from a consideration of the following detailed description, forming a part of the specification; nevertheless, it is to be understood that the invention is not confined to the disclosure, being susceptible of such changes and modifications which shall define no material departure from the salient features of the invention as expressed in the appended claims.

In carrying out the manufacture of paint three elements form an essential part of the composition and these elements include a body or base, a re-action-mixture and a vehicle forming mixture and each of these various mixtures or elements will be described in detail.

For the body of the paint Portland cement and silica, Portland cement and whiting, or Portland cement and any single inert mineral filler material having proper covering and hiding properties, and with which the cement will, in proper proportions, set and harden to a hard and durable stone-like mass, may be used with a reasonable degree of satisfaction. Talc and china clay or kaolin in small percentages add somewhat to ease of spread and may be used advantageously, either singly or in combination. The particular choice of mineral filler materials employed is in nowise essential to the basic principles involved, as long as the materials used satisfy the requirements mentioned above. Where pigments are used for colored paints, these also are inert materials and may properly be classed with inert mineral filler.

The proportions of cement to inert filler are not essential to the basic principles involved. There are, of course, optimum proportions which are to be preferred. For maximum durability of the paint film, the proportions of cement to total inert filler should be such that these materials alone will set and harden to a hard and durable stone-like mass. If no inert filler at all were used, the coating would be hard and durable, but would have some tendency to crack, owing to the contraction of the cement on setting. If so great a proportion of inert filler is used that the cement crystals cannot properly interlock, the coating will of course not have the maximum degree of durability.

The actual limits of the proportions which may be used to best advantage will depend upon the specific gravity and consequent bulk of the inert filler. For such fillers as amorphous silica, whiting and others of similar bulking capacity, as much as forty percent by weight inert filler may be used with sixty percent cement to give a coating of satisfactory hardness and durability, while as little as ten percent inert filler to ninety percent cement will give reasonable freedom from cracking. For other filler materials these limits will of course vary.

It is to be specifically understood that the above limits represent merely the optimum proportions, and not the only proportions which may be used. The vehicle used in the present paint attains a high degree of hardness and a substantial degree of weather-resistance on drying and it is therefore possible, because of this vehicle, to use less cement noted above and still have a reasonably satisfactory paint. For maximum durability, however, the proportions lying between the limits cited above are most advantageous and are preferred.

It will be appreciated that the paint must be mixed with water before application to the surface and in view of this it is necessary to regulate the setting speed of the cement. For this purpose a suitable retarding agent is employed to stay the setting of the cement for several hours. Such a retarding agent as calcium sulphate in suitable proportion is preferred. This agent may be introduced as ground dry gypsum or calcium sulphate in the Portland cement or it may be introduced as a re-action product formed by two or more materials. Other retarding agents may be employed either singly or in combination with the calcium sulphate and such agents may include other alkaline-earth-metal sulphates such as barium or strontium. Preferably, however, the calcium sulphate is employed as a re-action product of a soluble sulphate with a calcium compound such as the carbonate or hydroxide.

The quantity of retarding agent used, and consequently the qualities of reacting materials employed to produce the retarding agent, will depend upon the quantity of cement used in the body, due allowance being made for the retarding agent already present in the cement. Calcium sulphate, for example, in quantities of three percent or less, based on the cement used, serves as a retarder but in quantities much greater than this serves as an accelerator. The re-acting materials should be in such proportions to the cement that a suitable retarding action is obtained. Normally, Portland cement contains slightly less than two percent calcium sulphate, while as much as three percent may be used with a retarding effect. In the present paint a somewhat greater percentage than this can be used and a retarding effect still obtained, owing to the tendency of a caseinate vehicle to absorb lime and so serve as a contributory retarder. Or, because of this retarding effect of the caseinate vehicle, a reasonably satisfactory paint may be produced without introducing any other retarder. For optimum results, however, a small percentage of calcium sulphate as the retarder is preferred, the same being introduced as a reaction product.

Portland cement ordinarily requires some twenty-eight days to acquire its full strength. This rate of hardening will give a reasonably satisfactory paint. It is obvious, however, that a paint film which will gain its full strength more rapidly is to be preferred. It has been found that aluminum hydroxide, or, more correctly, hydrous aluminum oxide, precipitated in the cement in a highly hydrous condition as a reaction product, tends to accelerate the rate of hardening of the coating. Whether this hydrous aluminum oxide reacts with lime present in the mixture to form one or more of the calcium aluminates, or whether it joins the cement colloids as aluminum oxide, is not definitely known. In view of the small quantity of free lime present in the present paint, however, and of other reactions involving the lime, the latter behaviour is thought most probable.

This hydrous aluminum oxide may be produced by reacting a soluble aluminum salt with a mild base or hydroxide, or, where the aluminum salt hydrolizes in water to an acid, it may be reacted with a carbonate. Since a dry-powder paint preparation the reacting materials must be dry powders, the alkaline-earth-metal oxides, hydroxides and hydrous oxides and carbonates are especially applicable. Moreover, if an alum is reacted with an alkaline-earth-metal oxide, hydroxide, hydrous oxide or carbonate, the same reaction will produce both an alkaline-earth-metal sulphate and hydrous aluminum oxide.

The hydrous aluminum oxide can be used in quantities up to approximately twenty percent by weight of the cement in the body. Any percentage from about one percent up to twenty percent will have an appreciable and beneficial effect. If used in quantities greater than approximately twenty percent, the hydrous aluminum oxide will decrease the ultimate strength of the cement.

It has been found thoroughly satisfactory to produce both the hydrous aluminum oxide and the alkaline-earth-metal sulphate in the same reaction by reacting an alum with an alkaline-earth-metal oxide, hydroxide, hydrous oxide or carbonate as mentioned above and to base the amounts of the reacting materials employed entirely upon the quantity of alkaline-earth-metal sulphate produced. This in turn, for optimum results, is of course based upon the quantity of cement present in the body.

It is to be understood that it is not essential to the principles of this invention that both the hydrous aluminum oxide and the alkaline-earth-metal sulphate be produced in the same reaction rather than in two separate reactions. Producing the two materials by means of the same reaction is a refinement and simplification and is, of course, to be preferred.

To summarize, the reaction mixture consists of (a) a soluble sulphate or mixture of soluble sulphates, together with an alkaline-earth-metal compound or a mixture of alkaline-earth-metal compounds, which will in water react together to produce an alkaline-earth-metal sulphate or a mixture of alkaline-earth-metal sulphates, and (b) a soluble aluminum salt or a mixture of soluble aluminum salts, together with an alkaline-earth-metal compound or a mixture of alkaline-earth-metal compounds, which will in water react together to produce hydrous aluminum oxide, or (c) an alum or a mixture of alums, together with an alkaline-earth-metal compound or mixture of alkaline-earth compounds, which will in water react together to produce hydrous aluminum oxide and an alkaline-earth-metal sulphate, or hydrous aluminum oxide and a mixture of alkaline-earth-metal sulphates.

It has been found satisfactory to use calcium carbonates as the alkaline-earth-metal compound for this reaction and aluminum sulphate as the aluminum compound. Inasmuch as carbonate may also be used as the inert mineral filler in the body, its use in the reaction mixture is a refinement and simplification and is therefore advantageous.

The vehicle-forming mixture consists essentially of two elements: Caseins, or a mixture of caseins and a solvent or cutting agent. A hardening agent may be added at this stage to render the vehicle water-resistant after drying and a preservative agent may be introduced to protect the dry caseins in the paint from bacterial deterioration.

The casein goes into solution as a colloidal alkali-caseinate gel, which reacts with a hardening agent to produce an insoluble gel which when dried will not redissolve.

Any of the commercially available caseins may be employed and these caseins are designated in accordance with the method of manufacture, such as sulphuric, muriatic, lactic, acetic, rennet, grain curd. In other words, the sulphuric casein is so described because of the use of sulphuric acid in promoting the production of caseins.

For the solvent or "cutting" agent there is a wide range of choice in materials which may be used. Borax, sodium borophosphate, sodium silicate, sodium hydroxide, trisodium phosphate, sodium fluoride, sodium oxalate, sodium carbonate, sodium bicarbonate, sodium stannate, sodium arsenate, sodium sulphide, sodium sulphite, sodium aluminate, or a combination of two or more of these materials may be used. Or, more generally still, any alkaline chemical compound which will in water hydrolize to yield an alkali, or any combination of such compounds, or any two or more chemical compounds, which will in water react together to produce an alkali or a mixture of alkalies, may be used with varying degrees of satisfaction.

In general the milder alkalies are to be preferred especially mildly alkaline salts since the stronger alkalies cause a reaction which is difficult to control and greater care must be exercised in percentages used. It is also essential since the paint is sold in dry form that less hygroscopic salts are desirable.

The alkali-caseinate gel produced will have varying properties depending both upon the kind and quantity of solvent employed. The casein, after going into colloidal solution, starts breaking down into its primary cleavage products. After this breaking down has proceeded to a certain point, the gel ceases to be adhesive and also becomes practically inert chamically. The length of time during which the gel remains adhesive and chemically active may properly be called the "working life" of the gel as it is in the case of those gels which are used as glues. With some of the stronger alkalies, if used in substantial quantities, the gel will have a working life of only an hour or two. With some of the milder alkalies the gel may have a working life of twenty-four hours or more. When lime or some of the other alkaline-earth-metal hydroxides are used as the solvent, the working life may be a short period as from ten to fifteen minutes, owing to the rapid formation of an insoluble alkaline-earth-metal caseinate. It is worthy of note, however, that a combination of lime or other alkaline-earth-metal hydroxide and some alkali-group (sodium, potassium or ammonium) alkaline salt can be used to produce a gel which will have a working life of several hours. An alkaline-earth-metal hydroxide can be used both as the solvent and hardener. Since casein will go into solution colloidally in any aqueous solution which is sufficiently alkaline (above the iso-electric point of casein, pH 4.6), it probably gives the initial product an unsaturated calcium caseinate or other alkaline-earth-metal caseinate. This caseinate then reacts further with the lime or other alkaline-earth-metal compound to produce the insoluble alkaline-earth-caseinate. This latter reaction is largely one of physical adsorption on the part of the caseinate gel and the more nearly saturated this gel becomes, the more highly water-resistant it will be after drying. A gel so produced, however, has a short working life.

When an ammonia alum is used in the reaction-mixture and reacted with an alkaline-earth-metal oxide or hydroxide, ammonia is liberated and is available as a solvent or "cutting" agent for the casein used in the vehicle-forming mixture. If such a reaction-mixture is used in suitable proportions, it will not be necessary to use any other solvent agent for the casein. This is a refinement possessing certain advantages. The ammonia and casein react together to produce an ammonium-caseinate gel. The calcium or other alkaline-earth-metal ions present then displaces the ammonia, forming with the casein an alkaline-earth-metal caseinate. The ammonia, being volatile, evaporates off as the paint dries. The removal of the solvent agent through evaporation gives a vehicle appreciably more water-resistant after drying than can be obtained with a solvent agent which remains in the paint. On the other hand, because of the high alkaline-earth-metal content of the mixture necessary for this reaction, however, the gel does not have a very long working life, and is preferred in special paints adapted to restricted uses, where it would be quite advantageous. The viscosity of the alkali-caseinate gel will depend both upon the solvent and the quantity of the solvent or solvents used. With any given solvent or mixture of solvents, increasing the quantity of solvent, increases the viscosity of the resulting gel, up to a certain point, and beyond this point increasing the quantity of solvent or solvents decreases the viscosity again. The viscosity will also vary slightly, though not materially, with the kind of casein or caseins used. Where the alkali-locking or neutralizing capacity of the caseinate vehicle is not considered of importance it is of course advantageous to use both the kind and quantity of solvent which will give the maximum viscosity, since this makes it possible to use a smaller amount of casein to give a finished paint of a given viscosity. Since casein is one of the most costly materials used in the manufacture of cement paints, this is commercially desirable.

Borax is preferable as the solvent agent, for the reason that in the proper quantities it gives a gel having thoroughly satisfactory properties and in addition, borax is an excellent preservative agent for dry casein.

For the hardening agent or "insolubilizer" any of a number of materials may be used. Paraformaldehyde, aldehyde-ammonia, hexamethylenetetramine (or "hexamine") or some other formaldehyde-condensation product which will in water hydrolize to yield formaldehyde may be used. The formaldehyde, by forming what is probably an addition or condensation product with the casein, forms a gel having a high degree of water-resistance. Since casein will form insoluble addition or condensation products with practically all the base metals, substantially all the base metal salts are therefore usable. The quantity of hardener used will of course depend upon the quantity of casein and also upon the kind of hardener used.

Casein possesses a peculiar property which may be made of valuable use in a paint vehicle. The casein specified in the body or base, for the purpose of neutralizing the free alkali present in the cement may be omitted from the body in commercial manufacture if it is properly provided in the vehicle-forming mixture. After the casein and the alkaline solvent have reacted together in what are presumed to be chemically equivalent proportions, the alkali-caseinate gel produced can physically adsorb an additional amount of alkalies in considerable quantity. By using just sufficient solvent, then, to completely dissolve the casein, and by using just sufficient hardener to harden it, it is possible to produce a paint vehicle which will possess a considerable and valuable capacity for adsorbing further alkalies. Since cementitious surfaces normally contain free lime and other alkalies, and cement paints are most widely used on such surfaces, this alkali-adsorbing or "lime-locking" characteristic of a properly proportioned caseinate vehicle is important. Such a vehicle not only renders the paint itself effectively neutral, but also neutralizes excess alkalies present in the surface to which the paint is applied.

A paint constructed in accordance with the principles of the present invention may be successfully overcoated with oil paints, either immediately after drying or years after application without danger of saponification of the oil vehicle. Not only oil paints but pyroxylin lacquers and enamels and other coatings of a similar nature may be applied over the cement paint to thoroughly satisfactory results.

For the preservative agent bichloride of mercury is the most effective and may be used in very small percentages. Borax is thoroughly satisfactory and has the desirable advantage of being non-poisonous. As has been noted above, borax may be used both as the solvent and as the preservative agent. Any dry-powder germicide or disinfectant which will inhibit bacterial growth may be used as the preservative agent.

An important characteristic of the alkali-caseinate gel is the fact that when the casein is breaking down into its primary cleavage products the gel undergoes the process of syneresis, that is: a shrinking and a giving up of the water enclosed by the solid phase. This syneresis is rather slow in the case of a neutral or mildly alkaline gel, even when all excess water outside the solid phase is removed, as by evaporation or otherwise. In practice when the paint has been applied to the wall and the excess water can evaporate or be taken up by the cement in its hardening, the gel will synerize to a hard and dry mass. Now this slow giving up of water on the part of the vehicle is of worthwhile value in a cement paint for the reason that the cement requires moisture for its proper hardening, and moreover, if the coating is to attain its maximum hardness, the cement must be kept moderately damp for several hours after the paint has been applied to the wall. The caseinate gel, in its syneresis, supplies this necessary moisture in a thoroughly satisfactory manner so that in the present paint it is quite unnecessary to employ hygroscopic salts to attract moisture from the atmosphere to insure proper hardening of the cement.

Considering now the paint as a whole, the relative percentages of the three essential parts, body, reaction-mixture and vehicle-forming mixture will of course be subject to a rather wide range of choice.

The reaction-mixture may be omitted entirely and a reasonably satisfactory paint produced. With the re-action mixture omitted, the vehicle-forming mixture may form from three to twenty percent of the total mass of the paint. With the lower percentages of vehicle-forming mixture, the higher percentages of cement in the body should be used for maximum durability. Since cement paints are most widely used on cementitious surfaces, for best results a sufficient percentage of cement should be used so that the paint will take a true cement or "integral" bond to such surfaces, and not depend upon the adhesiveness of the vehicle for its bonding strength. With most of the possible ingredients mentioned, it will be found that at least forty percent by weight of the total paint should be cement and that from forty up to ninety percent cement will give satisfactory results.

Where provision is made for neutralizing the free alkali present in the cement, at least 8 parts of vehicle-forming mixture should be used for each 100 parts of cement. When such small percentages of vehicle-forming mixture are used no lime at all is added in the vehicle-forming mixture, the free lime in the cement serving as the "insolubilizer" for the vehicle. For a most widely applicable and generally satisfactory paint, it is preferable to use a considerably higher percentage of vehicle-forming mixture than this, and use in the vehicle-forming mixture just sufficient lime so that the lime added plus the lime present in the cement will properly serve as the "insolubilizer" for the vehicle. In the present paint we prefer to use from ten to twenty percent of vehicle-forming mixture and this is based on the total weight of the paint.

It is preferable to use approximately the following percentages, based on the total weight of the paint: Body: 70 to 90 percent, reaction-mixture: 5 to 10 percent and vehicle-forming mixture: 5 to 20 percent.

Or, more in detail, it is preferred to use the following ingredients in substantially the following proportions, all parts being by weight: Portland or other hydraulic cement, 100 parts; calcium carbonate, 10 to 50 parts; clay or kaolin, 2 to 10 parts; talc, 2 to 10 parts; hydrated lime, 2 to 10 parts; aluminum sulphate, 2 to 10 parts; borax, 1 to 5 parts and casein or a mixture of caseins, 2 to 10 parts.

The materials used should, in the finished paint, preferably all be as fine as Portland cement, that is, 85% through 200 mesh. It is advantageous, however, to have the finished paint considerably finer than this, and for this reason the paint is ground to a fineness of approximately 90% through 300 mesh, as the resulting product has much smoother flow, gives better coverage and is less abrasive on spray equipment. The reacting products of course dissolve more readily when they are finely ground and mixing is therefore easier.

For primary colors the pigments are ground into the paint, as this insures uniform dispersion of pigment matter. Secondary colors are made by blending primary colors in a mechanical mixer.

For application to a surface, the dry paint is placed in the mixing vessel and enough water added to produce a paste. This paste is thoroughly worked with the paddle and further water is added, with stirring, until a mixed paint of about the consistency of a slightly heavy oil paint is produced. The mixed paint may be applied with either brush or spray.

The aluminum sulphate, or alum preferably employed is the one having the formula $Al_2(SO_4)_3$ plus $18H_2O$ but other alums, such as ordinary alum known as potassium-aluminum sulphate, soda-alum, or ammonium-alum may be used.

I claim:

1. A dry powder cement and water paint adapted to be mixed with water before using comprising a Portland cement, a mineral filler and a quantity of calcium hydroxide and aluminum sulphate which when reacted together by the addition of water will produce not more than approximately twenty percent of hydrous aluminum oxide and not more than approximately three percent of calcium sulphate, the percentages employed being based on the quantity by weight of the cement used, the calcium sulphate acting as a retarding agent for the setting of the cement, a casein and formaldehyde which will form with the casein a product having a high degree of water resistance, sufficient casein being employed to absorb any excess lime present.

2. A dry powder cement and water paint adapted to be mixed with water before using comprising a Portland cement, a mineral filler and a quantity of calcium hydroxide and aluminum sulphate which when reacted together in the presence of water will form hydrous aluminum oxide and calcium sulphate, the percentage by weight of calcium hydroxide and aluminum sulphate employed to the weight of the Portland cement is such that no more than approximately three percent by weight of calcium sulphate is formed, the last-mentioned ingredient acting as a retarding agent, caseins, an alkaline solvent agent for the caseins and formaldehyde forming with the caseins a product acting as a binder having a high degree of water resistance.

WILLIAM P. D. MOROSS.